March 14, 1967  W. L. ELLIS ETAL  3,308,922
AUTOMATIC LEHR UNLOADER
Filed March 18, 1964  6 Sheets-Sheet 1
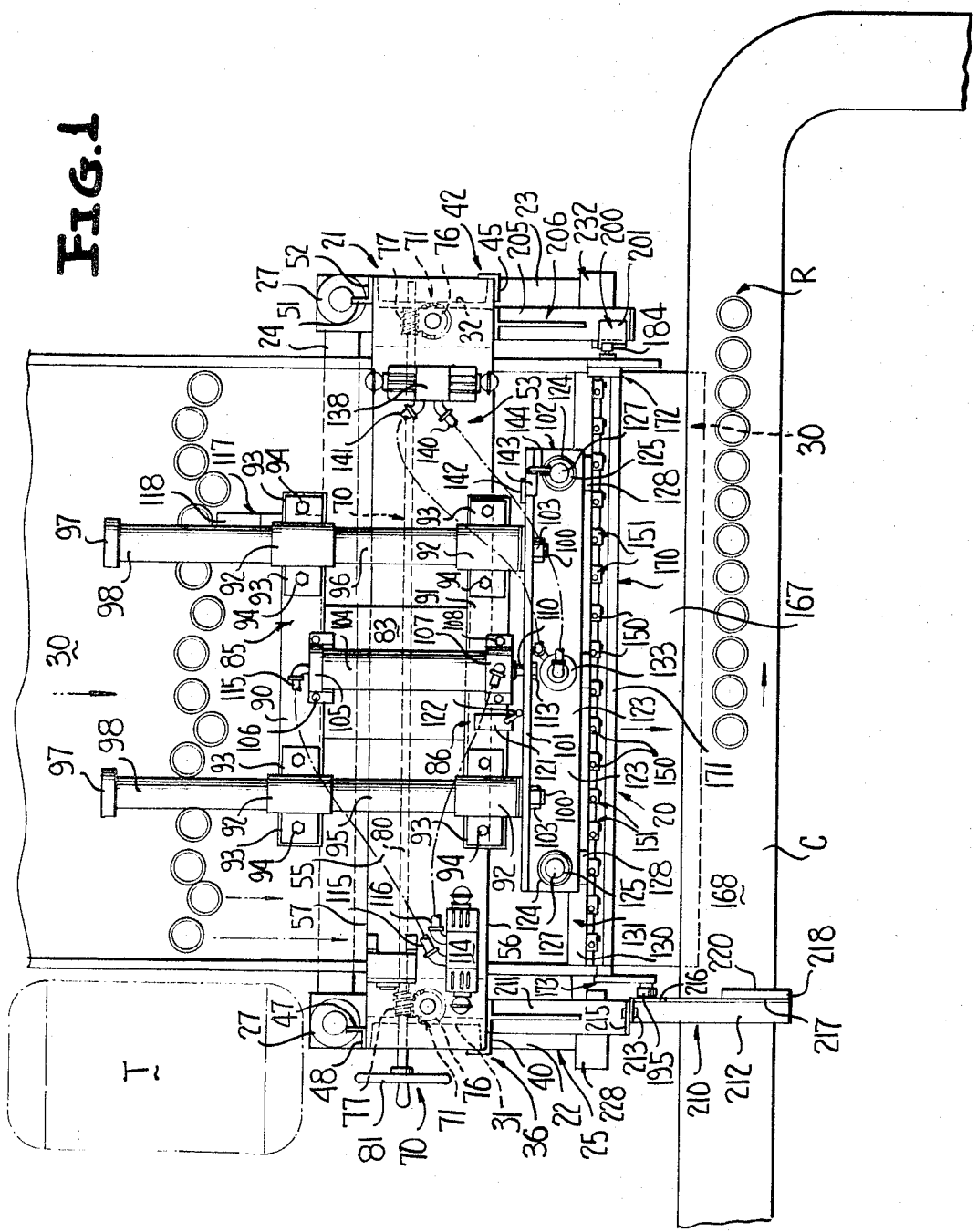
INVENTORS
WARREN L. ELLIS
& GEORGE E. RUCK
BY
Nixon, Porter, Miller & Stewart
ATTORNEYS

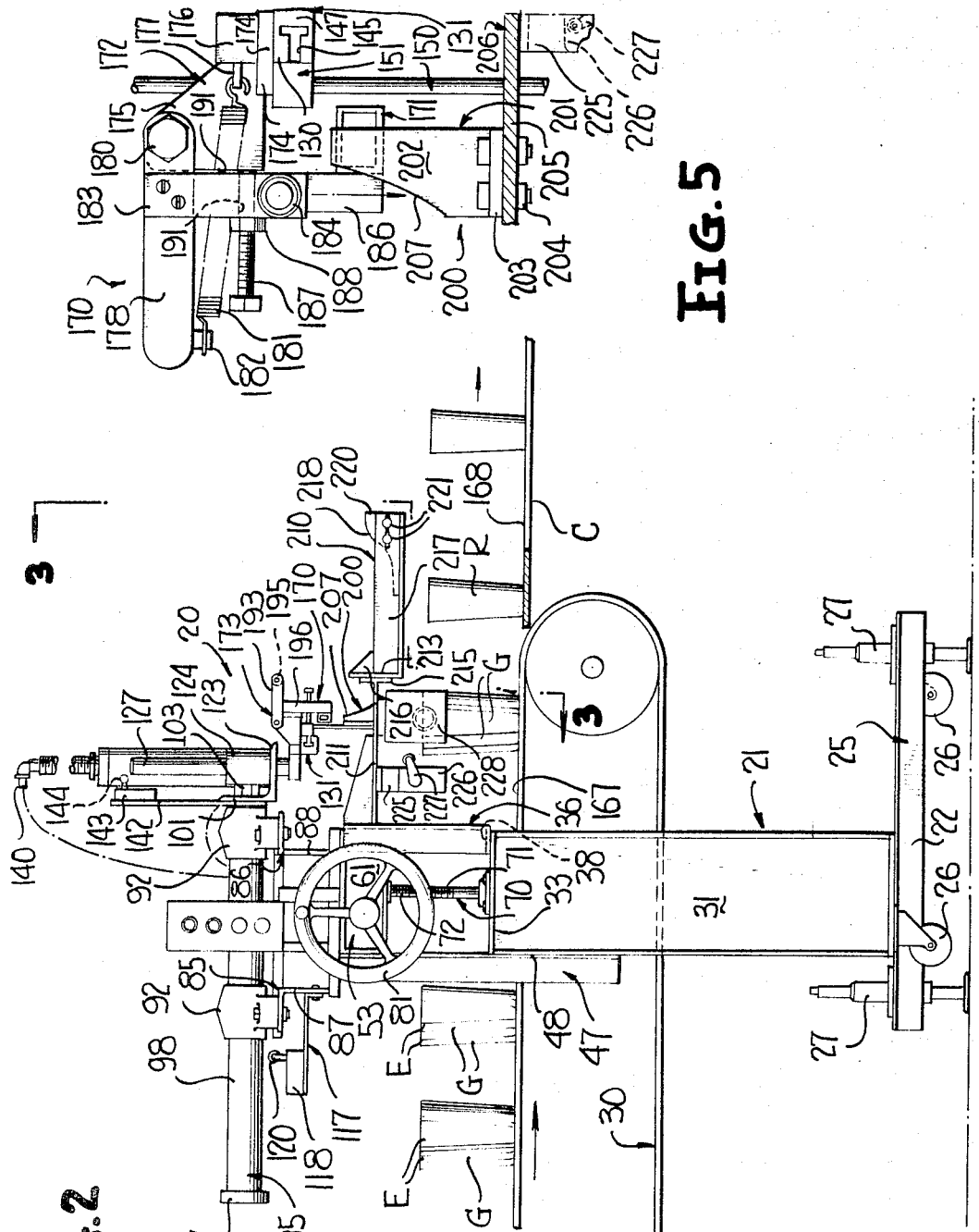

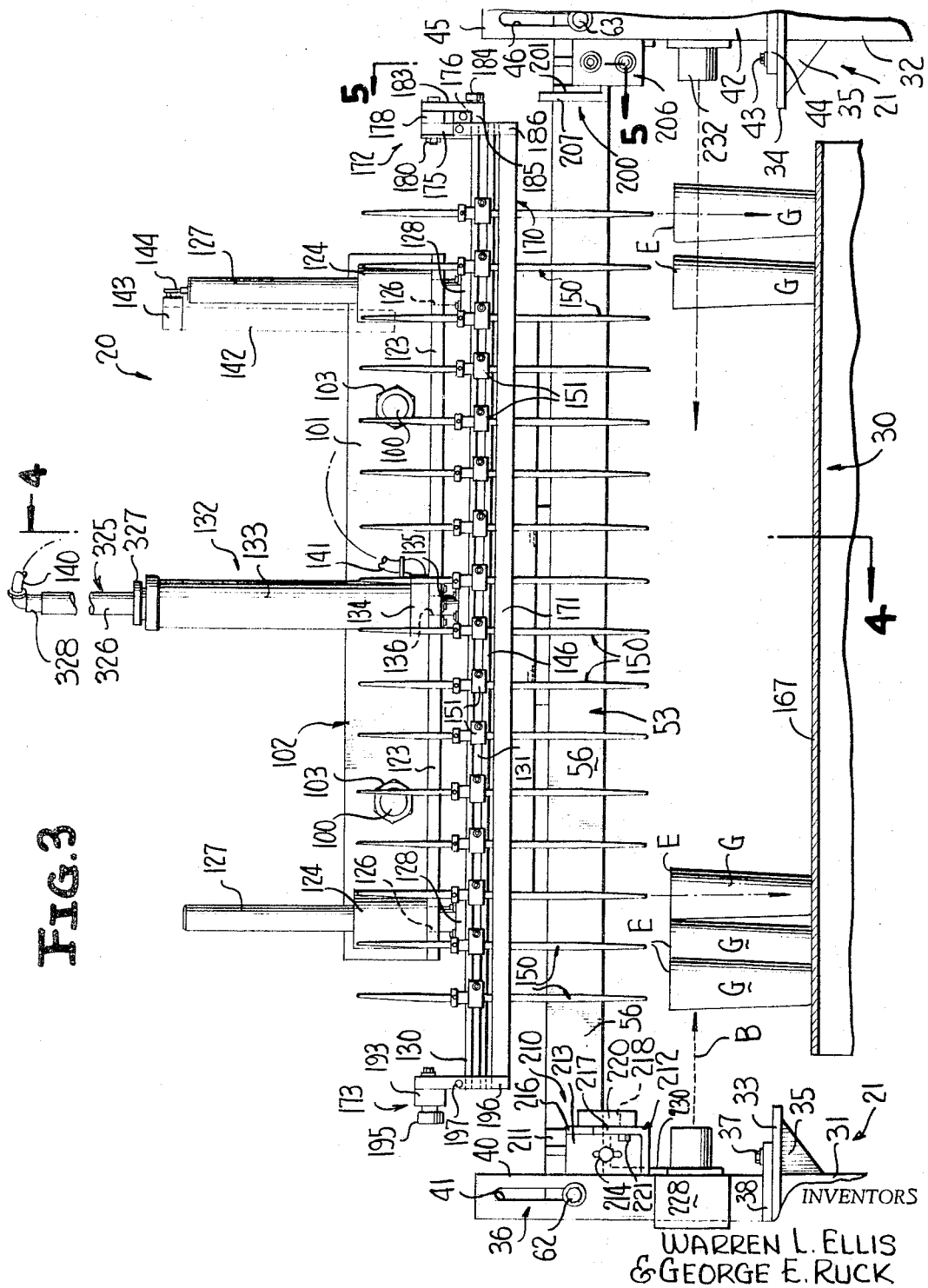

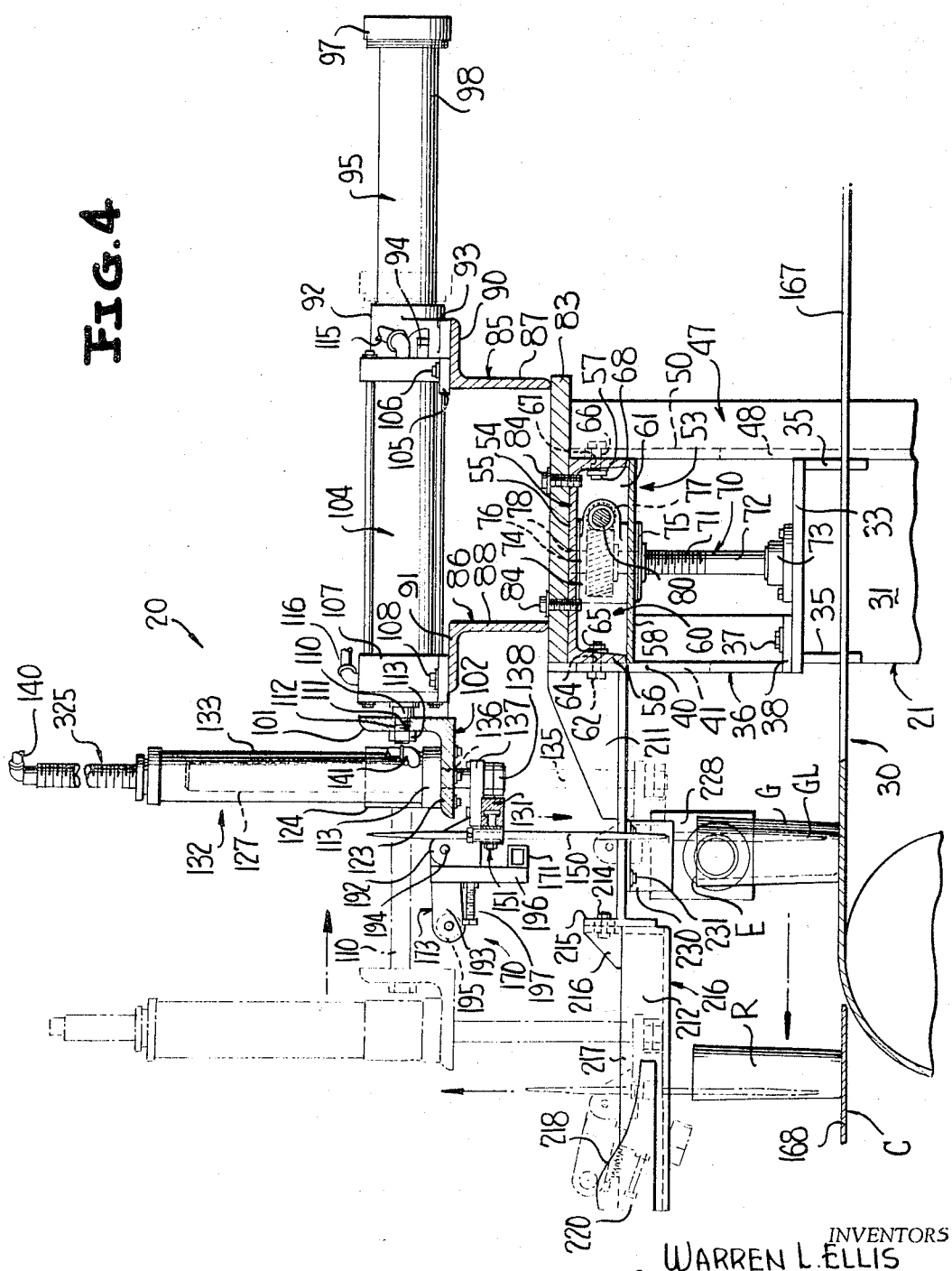

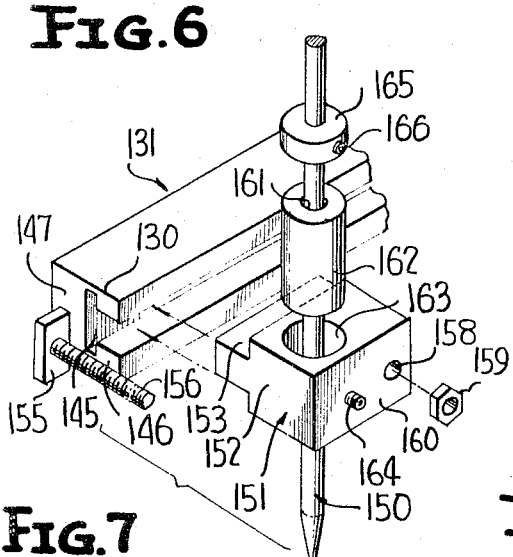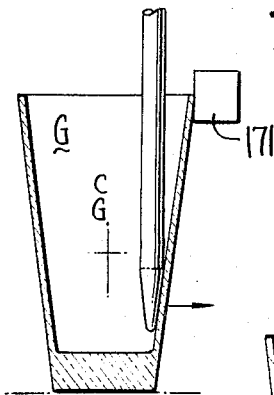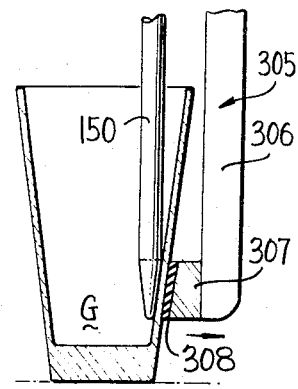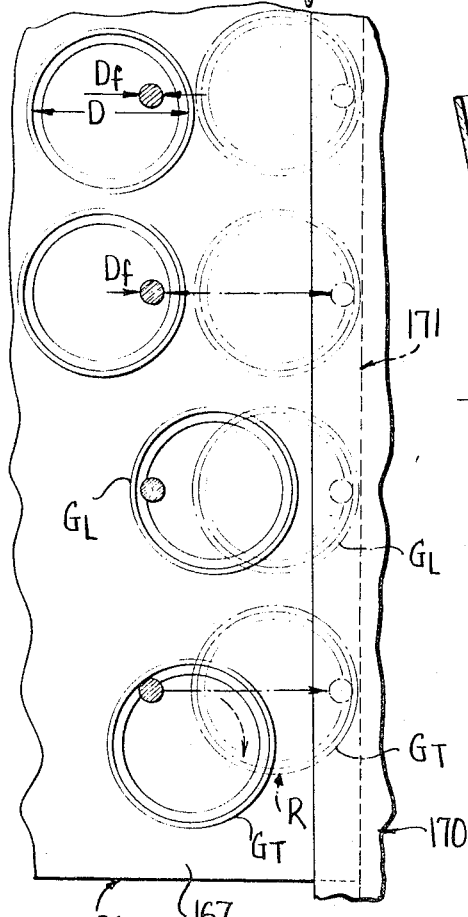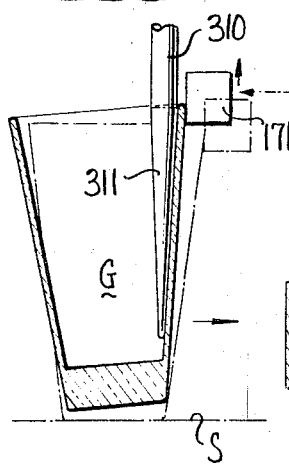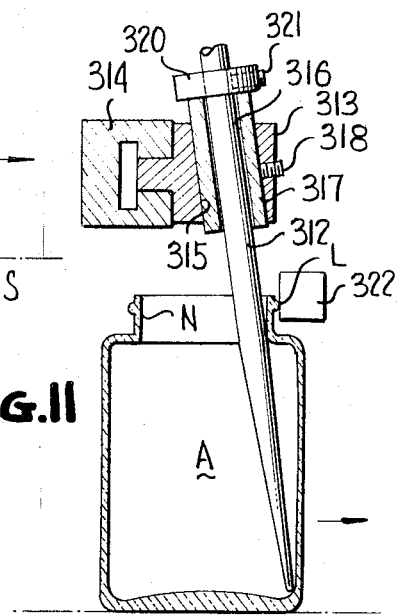

March 14, 1967 — W. L. ELLIS ETAL — 3,308,922
AUTOMATIC LEHR UNLOADER
Filed March 18, 1964 — 6 Sheets-Sheet 6

INVENTORS
WARREN L. ELLIS
& GEORGE E. RUCK
BY
ATTORNEYS 3,308,922
AUTOMATIC LEHR UNLOADER
Warren L. Ellis, Naperville, Ill., and George E. Ruck, Lancaster, Ohio, assignors, by mesne assignments, to Brockway Glass Company, Inc., Brockway, Pa., a corporation of New York
Filed Mar. 18, 1964, Ser. No. 352,921
27 Claims. (Cl. 198—30)

This invention relates to a novel apparatus for and a method of aligning a plurality of misaligned articles while the same are being transported by a first conveyor mechanism and transferring the articles from the first conveyor mechanism to a second conveyor mechanism in a single aligned row.

The invention relates in particular to an unloader apparatus for transferring a plurality of misaligned glassware articles from a lehr conveyor to a take-away conveyor positioned adjacent and substantially normal to the lehr conveyor, and aligning the articles in a single row substantially simultaneously with the transfer of the articles from the lehr conveyor to the take-away conveyor.

It is conventional in the glassware manufacturing industry to arrange individual glassware articles, such as bottles, jars, tumblers, etc., on a lehr conveyor in a plurality of longitudinal lines with the articles in adjacent lines being in spaced alignment to form transverse rows. The lehr conveyor transports these lines of glassware into and through a conventional lehr or annealing oven. During the passage of the glassware through the lehr oven, the relatively precisely aligned lines and rows become somewhat misaligned due to relative movement between the individual articles caused by the normal vibration of the lehr conveyor, the unsymmetrical expansion and contraction of the lehr conveyor and various other factors. Thus, the original alignment of the glassware is somewhat altered and the glassware leaves the lehr oven in a somewhat misaligned pattern which is undesirable for many reasons.

One reason, for example, is that upon leaving the lehr oven, the glassware is transferred to a take-away conveyor which is generally arranged adjacent and substantially normal to the upstream end of the lehr conveyor. When the glassware is transferred from the lehr conveyor to the take-away conveyor and is positioned on this latter conveyor in an irregular pattern there is a tendency for the glassware to jam together upon the take-away conveyor. Such jamming of the glassware can result in the glassware being tipped over and broken, or if not broken, the "finish" of such of the articles as are jammed together is damaged. Such jamming also can result in stoppage of glassware to subsequent machines or operations in the production line.

Furthermore, the glassware is generally inspected and/or gauged after, or as it is transported by the take-away conveyor. For optimum results during such inspection and/or gauging, whether by manual or automatic means, the individual articles of glassware should be positioned on the take-away conveyor in a single row of uniformly spaced articles.

Apparatus is presently commercially available for transferring glassware from a lehr conveyor to an adjacent take-away conveyor. However, such conventional apparatus is generally unacceptable for today's high speed automatic production of glassware, and in most cases, includes many inherent disadvantages which preclude the use of such conventional apparatus for high speed production. While conventional apparatus can transfer glassware from one conveyor to another, means for aligning the glassware and repositioning the aligned glassware on a conveyor mechanism is very frequently unprovided for by this apparatus.

For example, known conventional transfer mechanisms can include bar-like members which contact external surfaces of the glassware and push the glassware from one conveyor to an adjacent conveyor. If the glassware is misaligned or if the consecutive rows are close together it is not always possible to position the bar-like members between two consecutive transverse rows prior to pushing the glassware by these bar-like members, and there exists a tendency of the glassware to tip over and become damaged when contacted by these members. In addition, because such mechanisms generally lack means for maintaining adjacent glassware articles spaced from each other, the articles contact one another and the "finish" thereof can become marred or otherwise damaged. When articles of a generally inverted frusto-conical contour, such as tumblers, are transferred by these bar-like mechanisms the lips at the large diameter upper ends of the articles tend to chip and crack when article-jamming occurs. Such glassware is also basically unstable because of the relatively small diameter bottoms and is therefore readily susceptible to being tipped over by these bar-like mechanisms during a transfer operation. The tapered contour of frusto-conical articles usually does not permit these articles to be pushed against each other and at the same time be successfully transferred from one conveyor to another.

Conventional vacuum transfer mechanisms and mechanical grasping jaw mechanisms also possess many inherent disadvantages. A serious drawback of these mechanisms is their generally slow rate of operation, necessitated by the exactness with which these mechanisms must approach the articles which are to be gripped and transferred.

Vibratory dead pans are conventionally employed for transferring glassware between adjacent conveyors. The inherent vibratory motion of these pans generally prevents successful high speed transfer of glassware, particularly of the type having small diameter bottoms which are characterized by their basically unstable nature.

It is, therefore, an object of this invention to provide a novel apparatus for aligning articles being transported by a first conveyor, transferring the aligned articles toward another conveyor, and repositioning the articles on this latter conveyor in a single row of substantially equally spaced articles in a manner heretofore unprovided for by conventional apparatus.

A further object of this invention is to provide a novel apparatus particularly adapted for unloading glassware from a lehr conveyor and repositioning the glassware on a second conveyor in a single aligned row, the apparatus including a plurality of means for entering open ends of a plurality of misaligned articles being transported by a lehr conveyor, and means for moving the plurality of means in a direction substantially normal to the direction of entry of the means into the misaligned articles whereby the articles are substantially simultaneously aligned and transferred from the lehr conveyor to an adjacent conveyor.

A further object of this invention is to provide a novel apparatus of the type immediately above-described, and in addition, to provide means for stabilizing the articles so entered by the first means during at least a portion of the movement thereof in the last-mentioned direction.

Still another object of this invention is to provide a novel unloader apparatus including support means adapted for positioning above a conveyor transporting a plurality of misaligned articles having upwardly opening ends, a plurality of means for entering selected ones of the misaligned articles through the open ends thereof from a first direction, means for moving the plurality of means in the first direction, means for moving the plurality of means in a second direction substantially normal to the first direction whereby the selective ones of the articles are each internally contacted by the plurality of means and are aligned thereby, and means for stabilizing the articles during at least a portion of the movement thereof in the second direction.

Another object of this invention is to provide a novel unloader apparatus constructed in accordance with the above and including in addition thereto, means for lifting the selective ones of the articles during at least a portion of the movement thereof in the second direction.

A further object of this invention is to provide a novel unloader apparatus including a first member, a plurality of aligning fingers carried by the first member, means for moving the first member in first and second directions substantially normal to each other, a second member, means for movably mounting the second member with respect to the first member and in cooperative relationship with at least some of the plurality of aligning fingers, and the last-mentioned means including cam means for moving the second member in one direction as the first member is moved in the first direction and in another direction as the first member is moved in the second direction.

A further object of this invention is to provide a novel method of aligning a plurality of misaligned articles including the steps of positioning members in at least some of a plurality of misaligned articles and moving at least one of the members to create a turning moment whereby the article associated with the one member is urged into alignment with at least a second of the plurality of articles.

A further object of this invention is to provide a novel method of aligning a plurality of substantially identical misaligned articles comprising the steps of moving a finger of a plurality of aligning fingers in a first direction into each of a plurality of misaligned articles through an open upper end thereof, and moving the plurality of aligning fingers in a second direction substantially normal to the first direction to simultaneously transfer and align each of the misaligned articles.

With the above, and other objects in view that will hereinafter appear, the nature of the invention will be more clearly understood by reference to the following detailed description, the appended claims and the several views illustrated in the accompanying drawings.

In the drawings:

FIGURE 1 is a fragmentary top plan view of an unloader apparatus constructed in accordance with this invention, and illustrates the unloader straddling a discharge end portion of a lehr conveyor adjacent a take-away conveyor.

FIGURE 2 is a fragmentary side elevational view of the unloader of FIGURE 1, and illustrates a pneumatic cylinder for moving each of a plurality of aligning fingers into each of a plurality of misaligned articles carried by the lehr conveyor.

FIGURE 3 is an enlarged fragmentary front elevational view taken along line 3—3 of FIGURE 2, and illustrates the plurality of aligning fingers carried by a mounting bar positioned above and transverse to the upstream end portion of the lehr conveyor.

FIGURE 4 is a fragmentary sectional view taken along line 4—4 of FIGURE 3, and illustrates in phantom outline several positions of the plurality of aligning fingers during a single cycle of the unloader.

Figure 12:
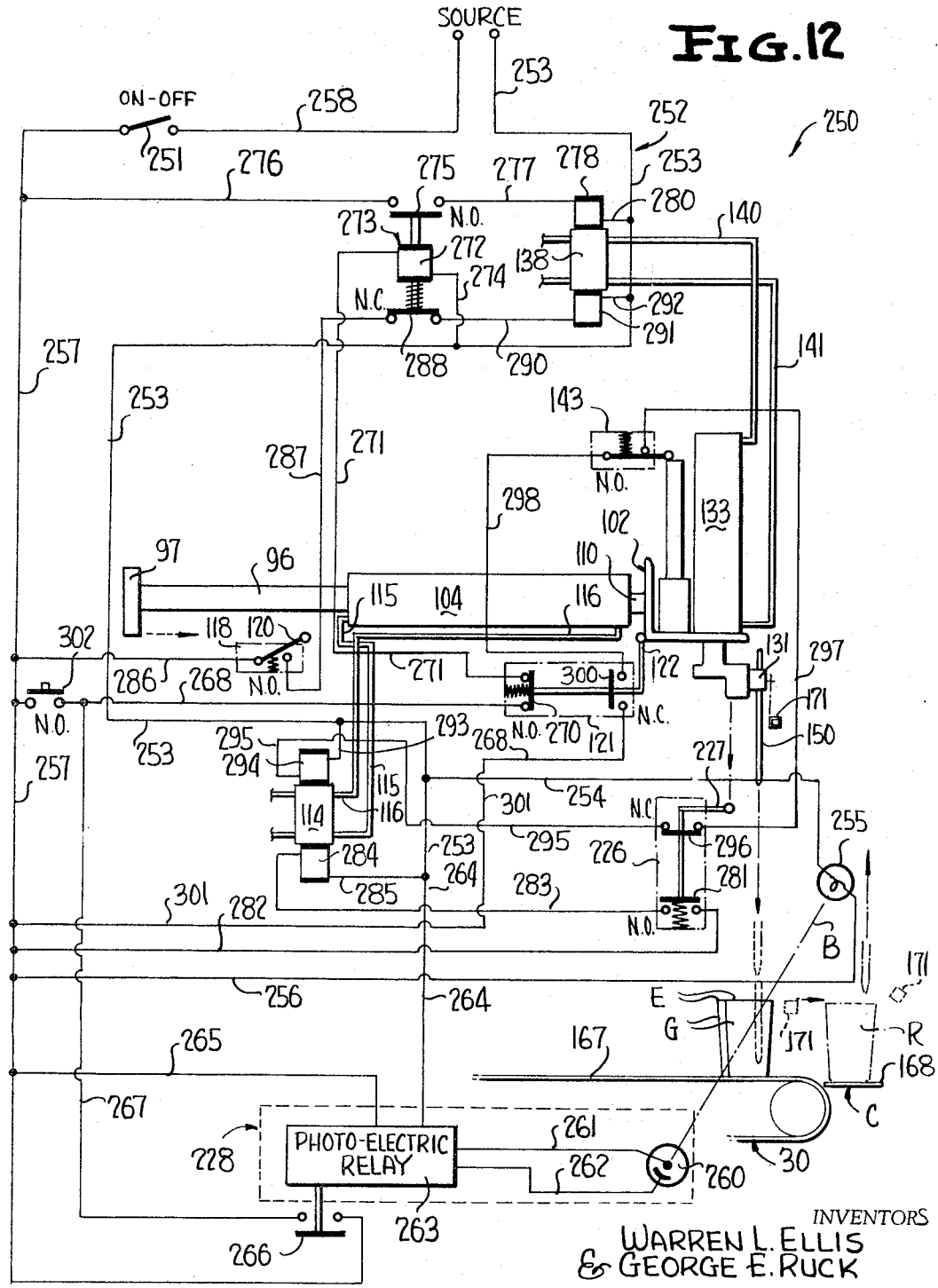

FIGURE 5 is an enlarged fragmentary side elevational view taken along line 5—5 of FIGURE 3, and illustrates a cam actuated stabilizer bar pivotally supported adjacent the plurality of aligning fingers and transverse to the lehr conveyor FIGURE 6 is a fragmentary exploded view of the mounting bar and one of the plurality of aligning fingers, and illustrates a bracket adjustably mounting the one aligning finger on the mounting bar.

FIGURE 7 is a fragmentary top plan view of a plurality of misaligned articles supported by a conveyor, and illustrates the articles in phantom outline after the same had been aligned by the unloader of this invention.

FIGURE 8 is a fragmentary schematic view, and illustrates the cooperative relationship between one of the plurality of aligning fingers and the stabilizer bar during a portion of the operating cycle of the unloader.

FIGURE 9 is a fragmentary schematic view of one of a plurality of aligning fingers positioned in a glassware article, and illustrates a stabilizer bar cooperating with the aligning finger to grip the glassware article during a portion of the operating cycle of the unloader.

FIGURE 10 is a fragmentary schematic view of a stabilizer bar and aligning finger, and illustrates a glassware article being lifted above an uppermost surface of a conveyor during the transfer of the article to a second conveyor.

FIGURE 11 is a fragmentary schematic view, and illustrates an aligning finger supported by a mounting bar in angular relationship to the axis of a glassware article.

FIGURE 12 is a circuit diagram of a system for automatically controlling the operation of the unloader of this invention, and schematically illustrates the various elements for imparting systematic cyclic motion to the plurality of aligning fingers for performing a successful transfer of articles from a first conveyor to a second conveyor while at the same time aligning such articles during the transfer thereof to the second conveyor.

A novel unloader apparatus constructed in accordance with this invention is best illustrated in FIGURES 1 through 4 of the drawings, to which attention is now directed, and is generally designated by the reference numeral 20.

The unloader 20 comprises a support 21 (FIGURES 1 and 2) having a pair of spaced parallel side rails 22, 23 joined to each other by a plurality of rails 24 (only one of which is illustrated in FIGURE 1) to form a generally rectangular base 25. A plurality of identical casters 26 and screw-type leveling jacks 27 are secured in a conventional manner to the base 25 of the support 21. The casters 26 facilitate the installation of the unloader 20 in an obvious manner when the leveling jacks 27 are retracted upwardly from the positions thereof illustrated in FIGURE 1 of the drawings. Once the unloader 20 is rolled to a straddle position above a lehr conveyor or belt 30, the leveling jacks 27 are lowered to the position illustrated in FIGURE 2 and adjusted to level the unloader 20.

A vertically upstanding side channel 31 (FIGURES 1 and 2) is secured to the side rail 22 of the base 25 in spaced, opposed, parallel relationship to an identical vertically upstanding side channel 32 (FIGURE 1) secured to the side rail 23 of the base 25. A plate 33 (FIGURES 2–4) is welded to an uppermost edge portion of the side channel 31 and is directed toward an identical plate 34 (FIGURE 3) welded to an upper edge portion of the side channel 32. The plates 33 and 34 are in a common horizontal plane, as is best illustrated in FIGURE 3 of the drawings, and each of the plates 33 and 34 is reinforced by a pair of identical brackets 35, 35, in a manner clearly illustrated in FIGURE 4 of the drawings.

A vertically upstanding angle bar 36 which is substantially L-shaped in transverse section (FIGURE 1) is secured to the plate 33 of the side channel 31 by a plurality of bolts 37 (only one being illustrated), passing through an apertured foot 38 of the angle bar 36 and threadably secured to the plate 33. A flange 40 of the angle bar 36 is provided with an elongated vertical slot 41 for a purpose to be described more fully hereafter.

A substantially identical upstanding angle bar 42 which is also L-shaped in transverse section is secured to the horizontal plate 34 of the side channel 32 by a plurality of bolts 43 (only one of which is shown) passed through openings (not shown) in a foot 44 of the angle bar 42 and threadably secured to the horizontal plate 34. A flange 45 of the angle bar 42 is in vertical coplanar relationship with the flange 40 of the angle bar 36 (FIGURE 1) and is also provided with a vertical elongated slot 46.

A second angle bar 47 (FIGURES 1, 2 and 4) which is also substantially L-shaped in transverse section is welded or otherwise conventionally secured to the side channel 31. A flange 48 of the angle bar 47 is in spaced parallel relationship to the flange 40 of the angle bar 36 (FIGURES 1 and 4), and has an elongated vertical slot 50 in vertical alignment with the slot 41 of the flange 40.

An upstanding angle bar 51, identical to the angle bar 47, is welded or otherwise conventionally secured to the side channel 32 of the support 21. The angle bar 51 is substantially L-shaped in transverse section and has a flange 52 in spaced parallel relationship to the flange 45 of the angle bar 42 (FIGURE 1). The flange 52 has a vertically elongated slot (not shown) which is identical to the slots 41, 46 and 50, and is in vertical alignment with the slot 46 in the flange 45 of the angle bar 42.

The upstanding angle bars 36, 42, 47 and 51 define a vertical guideway (unnumbered) which receives and confines a vertically adjustable transverse support 53. The transverse support 53 is best illustrated in FIGURES 1, 2 and 4 of the drawings, and comprises an inverted substantially U-shaped channel 54 having a bight portion 55 (FIGURE 4) and opposed downwardly directed flanges or legs 56 and 57. A plate 58 extends the length of the transverse support 53 and is welded or otherwise conventionally secured between the flanges 56 and 57 of the channel 54 to define a chamber 60 closed at opposite ends thereof by a plate 61, only one of which is illustrated. The flange 57 of the inverted U-shaped channel 54 is in guiding abutment with the flanges 48 and 52 of the respective angle bars 47 and 51 (FIGURE 1), while the flange 56 of the channel 54 is in similar guiding abutment with the flanges 40 and 45 of the respective angle bars 36 and 42. Bolts 62 and 63 (FIGURE 3) project through the respective vertical slots 41 and 46 in the flanges 40 and 45 of the angle bars 36 and 42. Each of two bolts 62 and 63 projects through an identical opening 64 (FIGURE 4) in opposite ends of the flange 56 and an identical nut 65 is threaded upon each of the bolts 62 and 63, there being only one such opening and nut illustrated in the drawings. A bolt 66 (FIGURE 4) projects through each of the vertical slots in the flanges 48 and 52 of the respective angle bars 47 and 51, and each of these bolts projects through an opening 67 (FIGURE 4) at opposite ends of the flange 57 of the inverted U shaped channel 54. An identical nut 68 is threaded to each of these bolts 66. When the bolts 62, 63, 66 and the nuts 65, 68 are loosened the transverse support 53 is freed for vertical movement within the guideway defined by the angle bars 36, 42, 47 and 51. After the transverse support 53 is adjusted by a mechanism to be described immediately hereafter, the last-mentioned bolts and nuts are tightened to secure the transverse support 53 in its adjusted position.

The transverse support 53 is adjusted by a mechanism 70 which comprises a pair of identical screw jacks 71, 71. The screw jacks 71 are positioned at opposite ends of the transverse support 53, as is best illustrated in FIGURE 1 of the drawings, and an identical externally threaded screw 72 of each of the screw jacks 71 is rotatably journalled in a mounting plate 73 (FIGURE 4) conventionally secured to an associated one of each of the horizontal plates 33 and 34 carried by the respective side channels 31 and 32. Each of the screws 71 is received in a worm and wheel housing 74 secured generally within the chamber 60 of the transverse support 53. A portion 75 of each of the worm and wheel housings 74 projects downwardly through an associated opening (unnumbered) in the plate 58 of the transverse support 53. A wheel 76 in mesh with a worm 77 is journalled in each of the worm and wheel housings 74 of the screw jacks 71 in a conventional manner. Each of the wheels 76 has an axially threaded bore (unnumbered) and threadably receives therein one of the externally threaded screws 72. An opening 78 in the bight portion 55 of the inverted U-shaped channel 54 is in axial alignment with each of the screws 72 of the screw jacks 71 to permit the upper end portion (unnumbered) of each of the screws 72 to project freely through the transverse support 53 as the same descends from the position illustrated in FIGURE 4 during the rotation of the wheel 76 in a known manner.

The wheels 76 of the adjusting mechanism 70 are rotated in synchronism by a shaft 80 (FIGURE 1) to which each of the worms 77 is keyed in a conventional manner. An end portion of the shaft 80 projecting through an opening (unnumbered) in the end plate 61 of the transverse support 53 is provided with a hand wheel 81. Thus, by rotating the hand wheel 81, the worms 77 are rotated in unison to impart uniform upward or downward motion to the transverse support 53 by the uniform threading or unthreading of the wheels 76 and the worms 77.

A substantially rectangular reinforcing plate 83 (FIGURES 1 and 4) is secured to a midportion of the transverse support 53 by a plurality of identical bolts 84 in a manner clearly illustrated in FIGURE 4. A pair of identical inverted L-shaped beams 85 and 86 are supported in spaced parallel relationship atop the plate 83 (FIGURE 4). Vertical flanges 87 and 88 of the respective beams 85 and 86 are each welded or otherwise conventionally secured to the plate 83 carried by the transverse support 53. Horizontal flanges 90 and 91 of the respective beams 85 and 86 are in coplanar relationship and are oppositely directed.

Identical guide rod brackets 92 (FIGURE 1) having flanges 93 are secured to the end portions of the flanges 90 and 91 of the respective beams 85 and 86 by a plurality of identical bolts 94. Each of the brackets 92 has a circular bore (not shown) and a sleeve-like anti-friction bearing (also not shown) is secured in each of these circular bores. The bores of the guide rod brackets 92 secured to the left-hand end portion of the beams 85 and 86, as viewed in FIGURE 1, are in axial alignment as are the bores of the guide rod brackets 92 secured to the right-hand end portions of the beams 85 and 86, as viewed in the same figure.

An identical cylindrical guide rod 95 and 96 is slidably received through the anti-friction bushings in the aligned bores of the brackets 92. Each of the guide rods 95, 96 has a collar 97 adjustably carried by a first end portion 98 thereof, and a second reduced end portion 100 (FIGURES 1 and 3) of each of the guide rods 95, 96 is threaded. The reduced threaded end portions 100 of the guide rods 95 and 96 each project through an associated opening (not shown) in a flange 101 of an inverted L-shaped cross head 102. An identical nut 103 threaded upon each of the threaded second end portions 100 of the guide rods 95, 96 positively secures the cross head 102 to these guide rods.

A pneumatic cylinder 104 is secured across the flanges 90 and 91 of the respective beams 85 and 86 at a position substantially midway between and parallel to the guide bars 95 and 96. A bracket 105 and bolts 106 secure the cylinder 104 to the flange 90 of the beam 85 (FIGURE 4) and a bracket 107 and bolts 108 similarly secure the cylinder 104 to the flange 91 of the beam 86. A conventional piston head (not shown) is reciprocally mounted in the interior of the cylinder 104. A piston rod 110 is secured at one end thereof (not shown) to the piston head and an opposite threaded end portion 111 of the piston rod 110 is received in an opening 112 (FIGURE 4) in the flange 101 of the cross head 102. A nut 113 threaded to the end portion 111 of the piston rod 110 secures the cross head 102 to the piston rod 110.

The cross head 102 is reciprocated in a horizontal plane by selectively introducing air under pressure into the cylinder 104, and the cross head 102 is accurately guided during such reciprocation by the guide rods 95 and 96 sliding in the bushings (not shown) of the aligned guide rod brackets 92. The air for reciprocating the piston head (not shown) in the cylinder 104 is introduced into the cylinder 104 from a conventional source of pressurized air, such as an air tank T of FIGURE 1. A flexible conduit (not shown) connects the air tank T to the input side of a four-way solenoid operated air valve 114 (FIGURE 1) carried by the transverse support 53. A flexible conduit 115 is connected between one side of the cylinder 104 and the four-way valve 114, while another flexible conduit 116 places the four-way valve 114 in fluid communication with the opposite end of the cylinder 104.

The valve 114 is selectively controlled by a control system of FIGURE 12 which will be described more fully hereafter. However, during such control of the valve 114, air is introduced through the conduit 115 and is simultaneously exhausted or vented through the conduit 116 to cause reciprocation of the piston rod 110 outwardly of the cylinder 104 which in turn causes movement of the cross head 102 away from the cylinder 104. When this air flow is reversed under the control of the valve 114, i.e., air being introduced through the conduit 116 and vented through the conduit 115, the piston rod 110 moves into the cylinder 104 drawing the cross head 102 toward the cylinder.

A bracket 117 (FIGURES 1 and 2) is bolted to the flange 87 of the beam 85 in underlying aligned relationship to the end portion 98 of the guide rod 96. A switch 118 having a switch arm 120 is carried by the bracket 117. The switch arm 120 is directed upwardly as viewed in FIGURE 2, and is activated by being contacted by the collar 97 of the guide bar 96 for a purpose to be described more fully hereafter.

A switch 121 (FIGURE 1) having a switching arm 122 is secured in a conventional manner to the flange 91 of the beam 86. The switch arm 122 of the switch 121 is actuated by the contact thereof with the flange 101 of the cross head 102 when the piston rod 110 is fully retracted in the cylinder 104 for a purpose to be described more fully hereafter.

The inverted L-shaped cross head 102 also includes a horizontal flange 123. An identical vertical guide cylinder 124 (FIGURES 1 and 3) is welded to opposite end portions of the horizontal flange 123 of the cross head 102. A sleeve-like anti-friction bushing 125 is secured in each of the guide cylinders 124 and a bore (unnumbered) of each of the bushings 125 is in axial alignment with an opening 126 (FIGURE 3) in the horizontal flange 123. An identical vertical guide rod 127 is slidably received through the bushing 125 in each of the guide cylinders 124 and projects downwardly through the openings 126 in the flange 123 aligned therewith. A plate 128 (FIGURE 3) is carried by the end portion of each of the vertical guide rods 127 projecting beneath the horizontal flange 123 of the cross head 102. A plurality of bolts (unnumbered) secure the plates 128 to an upper flange 130 of a transverse finger mounting bar 131 which is of a substantially C-shaped transverse cross-sectional configuration as viewed in FIGURE 2 of the drawings. The transverse finger mounting bar 131 is adapted for vertical reciprocal movement, and during such movement, the mounting bar 131 is guided by the vertical guide bars 127 and the guide clyinders 124 in substantially the same manner as the guide bars 95 and 96 are guided by the guide bar brackets 92.

The finger mounting bar 131 is moved vertically upwardly and downwardly by a pneumatic mechanism 132 which comprises a vertically disposed pneumatic cylinder 133 having a bottom peripheral flange 134 secured to the flange 123 of the cross head 102 by a plurality of bolts (unnumbered). A piston rod 135 carrying a piston head (not shown) is reciprocally mounted in the vertical cylinder 133, and the piston rod 135 passes through an opening 136 in the flange 123. A lowermost end portion of the piston rod 135 is externally threaded and projects through an opening (not shown) in a plate 137 (FIGURE 4). Two identical nuts 138 secure the plate 137 to the threaded end portion of the piston rod 135 in a manner clearly shown in FIGURE 4. The plate 137 is in turn secured to the upper flange 130 of the finger mounting bar 131 by a plurality of bolts (unnumbered). The finger mounting bar 131 is reciprocated vertically by selectively introducing air under pressure into the vertical cylinder 133. The air is so introduced into the cylinder 133 from the air tank T of FIGURE 1. A flexible conduit (not shown) connects the air tank T to the input side of a four-way solenoid operated air valve 138 (FIGURE 1) carried by the transverse support 53. A flexible conduit 140 is connected between one side of the vertical cylinder 133 and the valve 138, while another flexible conduit 141 places the valve 138 in fluid communication with the opposite end of the vertical cylinder 133.

The valve 138 is selectively controlled by the control ssytem of FIGURE 12 in a manner to be described hereafter. During the operation of the valve 138, air is introduced through the conduit 140 and is simultaneously exhausted or vented through the conduit 141 to reciprocate the piston rod 135 outwardly of the cylinder 133 causing downward movement of the finger mounting bar 131 away from the cylinder 133 toward the lehr conveyor 30, as shown in phantom outline in FIGURE 4. When the air flow is reversed under the control of the valve 138, i.e., air being introduced through the conduit 141 and vented or exhausted through the conduit 140, the piston rod 135 moves into the cylinder 133 drawing the finger mounting bar 131 upwardly toward the cylinder 133 and away from the lehr conveyor 30.

A vertical bracket 142 (FIGURES 2 and 3) is welded to the flange 101 of the cross head 102 in parallel spaced relationship to the right-handmost guide bar 127 of FIGURE 3. A switch 143 having a movable switch arm 144 is carried by the bracket 142. The switch arm 144 overlies this guide rod and is actuated by being contacted thereby when the guide rods 127 are in the uppermost positions thereof shown in FIGURE 3 of the drawings.

The finger mounting bar 131 has an elongated slot or channel 145 defined by the flange 130, an opposing lower flange 46 and a thickened bight portion 147 between these flanges. The slot 145 is of a substantially inverted T-shaped cross-sectional configuration. A plurality of elongated, transversely aligned, spaced aligning members or fingers 150 are each adjustably secured by an identical bracket 151 to the finger mounting bar 131 in a manner best illustrated in FIGURE 6 of the drawings, to which attention is now directed.

The bracket 151 of FIGURE 6 comprises a generally rectangular body 152 having a flange 153 directed toward the slot 145 of the finger mounting bar 131. A bolt 156 passes through a bore or opening 158 in the body 152 of the bracket 151, and a nut 159 is adapted for threaded engagement with the end portion of the bolt 156 projecting outwardly from a face 160 of the body 152. The bolt 156 has a rectangular head 155 which slidingly fits into the slot 145.

The bracket 151 is secured to the finger mounting bar 131 by tightening the nut 159 on the bolt 156 with the projection or flange 153 being received in the slot 145.

The finger 150 of FIGURE 6, and each of the plurality of fingers 150 illustrated in the drawings, is freely slidably received in a vertical bore 161 of a sleeve or bushing 162. The sleeve or bushing 162 is positioned in a vertical bore 163 of the body 152 and is clamped therein by a set screw 164 in a conventional manner. An annular adjusting ring or collar 165 is clamped to the finger 150 above the body 152 by a set screw 166. By varying the position of the adjusting collar 165, relative to the finger 150, the distance which the finger 150 projects beneath the body 152 of the bracket 151 can be varied.

As is best illustrated in FIGURES 3 and 4 of the drawings, the plurality of aligning fingers 150 are substantially equally spaced along the finger mounting bar 131, and are positioned slightly above an upwardly opening end or edge E of a plurality of misaligned glassware articles G being supported and conveyed by an upper run 167 of the lehr conveyor 30. However, when the pneumatic mechanism 132 is actuated in a manner to be described hereafter, the finger mounting bar 131 and the plurality of aligning fingers 150 carried thereby are moved downwardly from the position illustrated in FIGURE 3 to the phantom outline position of FIGURE 4 at which time one of each of the plurality of aligning fingers 150 enters a respective one of the plurality of misaligned glassware articles G on the upper run 167 of the lehr conveyor 30. After a finger 150 is positioned in each of the misaligned articles G, the finger mounting bar 131 and the aligning fingers 150 carried thereby are moved from right-to-left as viewed in FIGURE 4 of the drawings by the cylinder 104 to automatically align the misaligned glassware articles G and simultaneously transfer these articles to an upper run 168 of a take-away conveyor C in a manner to be described more fully hereafter.

A stabilizer mechanism 170 (FIGURES 3 through 5) is arranged for cooperation with the plurality of aligning fingers 159 to stabilize the glassware G as the same is transferred between the lehr conveyor 30 and the take-away conveyor C. The stabilizer mechanism 170 comprises a stabilizer bar 171 positioned in spaced parallel relationship to the finger mounting bar 131 slightly forward of each of the plurality of aligning fingers 150, as is best illustrated in FIGURE 5 of the drawings. The stabilizer bar 171 is secured to the finger mounting bar 131 by pivotable connections 172 and 173 at opposite ends of the bars 131 and 171. The connection 172 (FIG. 5) comprises a horizontal mounting plate 174 welded or otherwise conventionally secured to the upper surface of the flange 130 of the finger mounting bar 131. A vertically upstanding triangularly shaped plate 175 is welded to the horizontal plate 174 in a plane substantially normal thereto. A substantially square body 176 is welded to each of the plates 174 and 175 and an eye bolt 177 is secured to the square body 176. A substantially normally horizontally disposed arm 178 is pivotally connected to the triangular plate 175 by a conventional pivot pin 180. A spring 181 is connected between the eye bolt 177 of the body 176 and a grooved stub 182 depending downwardly from the end portion of the arm 178 remote from the pivot pin 180. The spring 181 tends to pivot the arm 178 about the pivot pin 180 in a counterclockwise direction as viewed in FIGURE 5 of the drawings.

An arm 183 is welded or otherwise secured by conventional fasteners to the arm 178 adjacent the pivot pin 180. The arm 183 carries a roller 184 at a lowermost end portion thereof. A portion 185 (FIGURE 3) at the lower end of the arm 183 is directed toward the triangular plate 175, and a support arm 186 is welded to this portion of the arm 183. The support arm 186 is in coplanar vertical alignment with the triangular bracket 175, as is best illustrated in FIGURE 3. One end of the stabilizer bar 171 is welded to a lowermost portion of the support arm 186 while a bolt 187 carrying a nut 188 is threadably received in a horizontal bore 190 in an upper end portion of the support arm 186. The bore 190 opens toward a face 191 of the triangular plate 175.

A pivotable connection 173 (FIGURES 3 and 4) of the stabilizer mechanism 170 is similar to the pivotable connection 172 and includes a vertically upstanding triangular plate 192 secured to the finger mounting bar 131 in transverse alignment with the triangular plate 175 of the pivotable connection 172. A horizontal arm 193 is connected by a conventional pivot pin 194 to the triangular plate 192, as is clearly shown in FIGURE 4 of the drawings. A roller 195 is connected to an extreme end portion of the horizontal arm 193. A vertical support arm 196 is welded or otherwise conventionally secured to the horizontal arm 193 adjacent the triangular bracket 192. A lower end portion of the supporting arm 196 is welded to an end portion of the stabilizer bar 171 remote from the connection of the stabilizer bar 171 with the support arm 186 of the pivotable connection 172. A bolt 197, similar to the bolt 187 of FIGURE 5, is threaded through the supporting arm 196 for engagement with a face (unnumbered) of the triangular bracket 192 opposing an end portion of the bolt 197. The bolt 197 is adjusted in a manner identical to that described in the consideration of the bolt 187 of FIGURE 5, and cooperates with the bolt 187 to vary the distance between the stabilizer bar 171 and each of the plurality of fingers 150 in an obvious manner.

The roller 184 carried by the vertical arm 183 of the pivotable connector 172 cooperates with a camming or cam mechanism 200 (FIGURES 1, 2 and 3) to pivot the stabilizer bar 171 of the stabilizer mechanism 170 in a direction away from the plurality of fingers 150 as the finger mounting bar 131 is reciprocated downwardly toward the lehr conveyor 30. The cam mechanism 200 comprises a substantially inverted L-shaped plate 201 having a vertical flange 202 and a horizontal flange 203 (FIGURE 5) secured by a plurality of identical bolts 204 to a horizontal flange 205 of an angle bar 206 (FIGURE 1) welded or otherwise conventionally secured to the flange 56 of the transverse support 53 (FIGURES 1 and 3). The flange 202 of the inverted L-shaped plate 201 has a cam or camming surface 207 in vertical alignment with the roll 184 carried by the arm 183 of the pivotable connector 172, as is best illustrated in FIGURE 3 of the drawings. As the finger mounting bar 131 is moved downwardly, the roll 184 contacts the camming surface 207 of the cam mechanism 200 and thereby pivots the vertical support arm 186 and the support arm 196 connected thereto by the stabilizer bar 171 in a direction away from the plurality of aligning fingers 150. This movement gradually and progressively increases the distance between the stabilizer bar 171 and the plurality of fingers 150 as the finger mounting bar 131 is reciprocated downwardly. This increase in the distance between the plurality of aligning fingers 150 and the stabilizer bar 171 prevents interference which would otherwise occur between the stabilizer bar 171 and the edges E of the glassware G on the lehr conveyor 30. It should be particularly noted that this pivoting of the stabilizer bar 171 away from the plurality of aligning fingers 150 is against the force of the spring 181 tending to urge the stabilizer bar 171 toward the plurality of aligning fingers 150. Thus, after the roll 184 leaves the camming surface 207 of the flange 202, the spring 181 tends to pivot the stabilizer bar 171 in an opposite direction toward the plurality of aligning fingers 150.

A camming mechanism 210 is carried by a bracket 211, which is substantially identical to the bracket 206, and is also similarly welded to the flange 56 of the transverse support 53 (FIGURE 3). The camming mechanism 210 includes an inverted substantially L-shaped angle bar 212 (FIGURE 3) having a base portion 213 secured by slot and bolt connections 214 to a vertical flange 215 (FIGURE 2) of the bracket 211. The slot and bolt connections 214 permit the camming mechanism 210 to be vertically adjusted in an obvious manner. A strengthening gusset plate 216 (FIGURE 2) is welded to a vertical flange 217 of the angle bar 212.

At the end of the downward motion of the finger mounting bar 131, the roller 184 is at the bottommost portion of the camming surface 207. Thereafter, as the mounting bar 131 is moved in a horizontal direction toward the take-away conveyor C in a manner to be described more fully hereafter, pivoting return of the stabilizer bar 171 toward the plurality of fingers 150 is accomplished by the spring 181.

As the finger mounting bar 131 continues to move in this horizontal direction, the roller 195 approaches and contacts a camming surface 218 forming a portion of a plate 220. The plate 220 is secured to the flange 217 of the camming mechanism 210 by two identical slot and bolt connections 221 which are of a conventional construction and which permit the plate 220 to be adjusted in a horizontal direction as viewed in FIGURE 2 of the drawings. The slope of the camming surface 218 of the plate 220 is initially relatively slight but eventually becomes abrupt. When the roller 195 eventually reaches the more abrupt portion of the camming surface 218 the stabilizer bar 171 is pivoted away from the plurality of fingers 150 in a manner and for a purpose to be described more fully hereafter.

An angle bracket 225 (FIGURES 2 and 5) is welded or otherwise conventionally secured to the horizontal flange 205 of the angle bar or bracket 206. The bracket 225 carries a switch 226 having a movable switching arm 227. The switching arm 227 is in vertical alignment with the finger mounting bar 131 and is actuated by contact therewith when the finger mounting bar 131 descends vertically downwardly from the position illustrated in FIGURE 2 to the position thereof shown in FIGURE 4. The purpose of the switch 226 will be described more fully hereafter in a consideration of the operation of the unloader of this invention.

A conventional photoelectric light detector 228 (FIGURES 3 and 4) is secured by an angle bracket 230 to the bracket 211 by a plurality of conventional bolt and nut connections 231 which permit the photoelectric unit 228 to be adjusted horizontally.

A conventional light source 232 (FIGURES 1 and 3) is also conventionally adjustably secured by a bracket (not shown) to the angle bar or bracket 206. The photoelectric unit 228 and the light source 232 are in transverse alignent across the upper run 167 of the lehr conveyor 30, and function in a conventional manner to detect a leading one of the plurality of glassware articles G being conveyed by the lehr conveyor 30 toward the take-away conveyor C. The photoelectric unit 228 and the light source 232 are mounted at a height above the upper run 167 of the lehr conveyor 30 so that fallen glassware articles G cannot "break" the beam of light, while erect glassware articles G can.

The unloader 20 is automatically controlled during the operation thereof by a control system 250 of FIGURE 12 of the drawings which will be completely described immediately hereafter in conjunction with a description of a single operating cycle of the unloader 20.

The unloader 20 is positioned, as heretofore described, adjacent a discharge end portion of the lehr conveyor 30. The lehr conveyor 30 is supported in a conventional manner and the upper run 167 thereof is advanced by a conventional drive mechanism toward the generally coplanar upper run 168 of the take-away conveyor C which is similarly conventionally supported and driven in a direction normal to the direction of the lehr conveyor 30, as is indicated by the directional arrow in FIGURE 1. The plurality of misaligned articles of glassware G are thus transported by the upper lehr run 167 of the lehr conveyor 30 toward the upper run 168 of the take-away conveyor C. At this time, the cross head 102 and the plurality of aligning fingers 150 carried by the finger mounting bar 131 are positioned above the upper run 167 of the lehr conveyor 30, as is best illustrated by the solid line position of these elements in FIGURES 4 and 12 of the drawings. The lowermost end portions of the aligning fingers 150 are at this time spaced slightly above the upwardly opening edge portions E of the misaligned glassware G on the lehr conveyor 30, and both of the piston rods 110 and 135 are retracted in their respective cylinders 104 and 133.

Operation of the unloader 20 is initiated by closing a normally opened manual on-off switch 251 of an electrical circuit 252 of the control system 250 of FIGURE 12. This establishes a circuit traced from a conventional source of electrical energy (Source) over a conductor 253, a conductor 254, a lamp 255, a conductor 256, a conductor 257, the now closed on-off switch 251 and a conductor 258 back to the Source to energize and light the lamp 255. The lamp 255 is an element of the conventional light source 232 (FIGURE 3) which directs a narrow beam of light B (FIGURES 3 and 12) above and across the upper run 167 of the lehr conveyor 30. This beam of light B from the lamp 255 impinges on a photoelectric cell 260 (FIGURES 3 and 12) supported opposite the conventional light source 232. The photoelectric cell 260 is connected by a pair of conductors 261 and 262 to a photoelectric relay 263 of the photoelectric relay 263 of the photoelectric detector 228. The photoelectric relay 263 is in a circuit traced over the conductor 253, a conductor 264, the relay 263, a conductor 265, the conductor 257, the now closed on-off switch 251 and the conductor 258.

As a leading article in a misaligned row of the glassware articles G transported by the upper run 167 of the lehr conveyor 30 "breaks" the beam of light B emitted by the lamp 255, the photoelectric relay 263 is actuated to close a normally open contact or switch 266 of the relay 263. This establishes a circuit traced over the conductor 258, now closed on-off switch 251, the conductor 257, the now closed relay switch 266 of the photoelectric relay 263, a conductor 267, a conductor 268, a normally open contact 270 of the switch 121 (held closed by the cross head 102 contacting the switch arm 122), a conductor 271, a solenoid 272 of a solenoid operated switch 273, a conductor 274 and the conductor 253. This circuit energizes the solenoid 272 of the switch 273 and closes a normally open contact 275 thereof.

The now closed normally open contact 275 of the switch 273 establishes a circuit over the conductor 258, the now closed on-off switch 251, the conductor 257, a conductor 276, the closed contact 275 of the switch 273, a conductor 277, a solenoid 278 of the solenoid operated air valve 138 (carried by the transverse support 53 of FIGURE 1), a conductor 280 and the conductor 253. The energization of the solenoid 278 of the air valve 138 positions a valve thereof (not shown) to cause air delivered from the tank T (FIGURE 1) to the air valve 138 to enter the vertical cylinder 133 through the conduit 140. Air is simultaneously vented from the cylinder 133 through the conduit 141 and the air valve 138. The air delivered through the conduit 140 urges the piston head (not shown) in the vertical cylinder 133 downwardly as viewed in FIGURES 4 and 12 of the drawings. This movement of the piston head urges the piston rod 135 secured thereto, the finger mounting bar 131, the plurality of aligning fingers 150 and the stabilizer mechanism 170 downwardly toward the upper run 167 of the lehr conveyor 30.

As these elements descend the roller 184 (FIGURES 1, 3 and 5) of the pivotable connection 172 contacts and is guided by the camming surface 207 of the bracket 201. This causes the stabilizer bar 171 of the stabilizer mechanism 170 to swing or pivot away from the plurality of aligning fingers 150 against the force of the tension spring 181 (FIGURE 5).

Since the glassware G on the upper run 167 of the lehr conveyor 30 is misaligned, the stabilizer bar 171 is swung away from the plurality of glassware articles G a distance just slightly greater than the external diameter of the glassware G, as is best illustrated in FIGURE 7 of the drawings. This prevents the stabilizer bar 171 from contacting the upper edge portions E of each of the misaligned glassware articles G, and in particular, prevents the stabilizer bar 171 from contacting an upstreammost or leading glassware article $G_L$ of the plurality of glassware articles G. Thus, the stabilizer bar 171 is prevented from interfering with the glassware G during the descent of the plurality of aligning fingers 150.

The misaligned articles of glassware G are of a predetermined internal diameter D (FIGURE 7) and each of the aligning fingers is also of a predetermined diameter $D_f$. Each one of the plurality of aligning fingers 150 is adapted to enter an associated one of the plurality of misaligned glassware articles G through an upper end portion or upper edge E thereof as the aligning fingers 140 are urged downwardly by the piston rod 135. To insure that a single aligning finger 150 is received in each of the misaligned glassware articles G, the aligning fingers 150 are spaced from each other on the finger mounting bar 131 a distance approximately equal to the center-to-center distance of the glassware articles at the time these articles are loaded upon the lehr conveyor 30 at the "hot" side thereof prior to the passage of the glassware through and beyond a conventional lehr or annealing oven. While the glassware G becomes misaligned during its movement with the lehr conveyor 30 through the lehr for the reasons heretofore noted, a single one of the plurality of aligning fingers 150 will enter each of the misaligned glassware articles G which are spaced from each other a distance no greater than slightly less than the difference between the internal diameter D of the glassware G and the diameter $D_f$ of the aligning fingers 150. That is, each of the articles of glassware G can be out of alignment by a distance approximately equal to the radius $D/2$ of the glassware G minus the radius $D_f/2$ of the aligning fingers 150 and will still receive the aligning fingers 150. For example, the aligning finger 150 associated with a leading glassware article $G_L$ enters this article just adjacent a rearmost or trailing edge portion thereof, as shown in FIGURE 7, while the aligning fingers 150 associated with the remaining trailing glassware articles enter these articles toward center and forward end portions thereof a distance corresponding to the difference that these latter articles are longitudinally displaced from the leading glassware article $G_L$. In the case of a trailing glassware article $G_T$, the aligning finger 150 associated therewith enters this article at a point just adjacent the forwardmost or upstream edge portion thereof. Thus, glassware articles positioned between the extremes exemplified by the articles $G_L$ and $G_T$ i.e., articles which are spaced from each other a distance no greater than the difference between the internal diameters D of the articles and the diameter $D_f$ of the aligning fingers 150, will be entered by an associated one of the aligning fingers 150.

The distance each of the plurality of aligning fingers 150 enters an associated one of the plurality of misaligned articles G is preselected, and is preferably a distance sufficient to position the lower endmost portions of the aligning fingers 150 below the center of gravity CG (FIGURE 8) of the glassware G. This distance is established by adjusting the aligning fingers 150 by the annular adjusting collar 165 in any selected position and thereafter locking the set screw 166.

Under certain circumstances, an endmost portion of one or more of the plurality of aligning fingers 150, contacts a peripheral edge of one or more of the misaligned glassware articles G. To prevent such articles from being tipped over, the aligning fingers 150 are slidably received in the bores 161 of the sleeves 162 in each of the finger mounting brackets 151 in the manner heretofore described. Thus, while the finger mounting bar 131 continues to move downwardly during this cycle of the unloader 20, the descent of any one of the aligning fingers 150 so contacting an edge of an article is prevented until the edge passes this finger. At such time the finger is, of course, free to enter the glassware article.

As the plurality of aligning fingers 150 approach the end of their descent into the plurality of glassware articles G and toward the upper run 167 of the lehr conveyor 30, the finger mounting bar 131 contacts the switch arm 227 (FIGURES 2 and 5) of the switch 226. This closes a normally open contact 281 of the switch 226 and establishes a circuit traced from the conductor 258, the closed on-off switch 251, the conductor 257, a conductor 282, the now closed normally open contact 281 of the switch 226, a conductor 283, a solenoid 284 of the solenoid operated air valve 114 (carried by the transverse support 53 in FIGURE 1), a conductor 285 and the conductor 253. The energization of the solenoid 284 of the valve 114 delivers pressurized air from the tank T (FIGURE 1) through a conduit (not shown) to the valve 114 and thence through the conduit 115 into the cylinder 104. Air is simultaneously vented through the conduit 116 and the valve 114. The air acting against the piston head (not shown) carried by the piston rod 110 in the cylinder 104 urges the piston rod 110, the cross head 102, the finger mounting bar 131, the stabilizer bar 171, the plurality of aligning fingers 150 and the misaligned glassware G receiving these fingers toward the take-away conveyor C. This movement of the piston rod 110 is substantially faster than the speed of the upper run 167 of the lehr conveyor 30 whereby the plurality of aligning fingers 150 contact the inner surfaces of the misaligned articles of glassware G below the centers of gravity CG thereof, and transport the glassware G toward the take-away conveyor C. During this movement of the aligning fingers 150 any of the glassware G which is transversely misaligned, such as the article $G_T$ of FIGURE 7, are rotated or swung in either a clockwise or a counterclockwise direction about the aligning fingers 150. The particular direction in which the transversely misaligned articles are rotated depends upon which side of the axes of the aligning fingers the axes of the transversely misaligned articles are positioned. In the case of the glassware articles $G_T$ of FIGURE 7, the aligning finger 150 associated therewith contacts this article and rotates or swings the same in a clockwise direction (as viewed in FIGURE 7) into a trailing position behind this finger, as is illustrated in phantom outline in FIGURE 7. Each of the remaining glassware articles G whose axes are offset to either side of the axes of the aligning fingers 150 is similarly brought into lateral alignment.

Where an axis of a glassware article, such as the article $G_L$, is in longitudinal alignment with the axis of an associated aligning finger, no rotating, pivoting or swinging of the article takes place.

During this horizontal movement of the plurality of aligning fingers 150 toward the take-away conveyor C each of the misaligned articles of glassware G is brought into lateral alignment with adjacent articles to form a single row R of aligned articles which are equally spaced from each other a center-to-center distance substantially equal to the center-to-center distance of the aligning fingers 150, as is clearly illustrated in phantom outline in FIGURE 7 of the drawings.

At substantially the same time that the aligning fingers 150 are being moved toward the take-away conveyor C, the stabilizer bar 171 is gradually pivoted toward the aligning fingers 150 under the force of the tension spring 181 (FIGURE 5). After the roller 184 leaves the camming surface 207, the stabilizer bar 171 is in light contact with the upper edge portion E of each of the articles of glassware G, as is again best illustrated in FIGURE 8 and in phantom outline in FIGURE 7 of the drawings. The exact distance of the stabilizer bar 171 from the aligning fingers 150 is established by a prior adjusting of the bolts 187 (FIGURE 5) and 197 (FIGURE 4) and the abutment thereof against the respective angle plates 175 and 192. In this manner the glassware G is stabilized between the time of alignment and the time the aligned row R of glassware articles is positioned on the take-away conveyor C.

As the aligning fingers 150 approach the take-away conveyor C, the roller 195 passes above the gradually sloped portion of the camming surface 218 of the camming mechanism 210 (FIGURES 2 and 4). This gradually sloped portion of the camming surface 218 allows smooth entry of the roller 195 onto the abrupt portion of the camming surface 218.

When the roller 195 reaches the abrupt portion of the camming surface 218, the stabilizer bar 171 is quickly pivoted away from the row of aligned glassware R on the take-away conveyor C. This rapid pivoting of the stabilizer bar 171 is desirable in preventing shifting between the articles after they have been positioned on the take-away conveyor C, and also permits rapid removal of the aligning fingers 150 from the row of glassware on the take-away conveyor C substantially simultaneously with the pivoting of the stabilizer bar 171.

This removal of the aligning fingers 150 is initiated substantially simultaneously with the abrupt pivoting of the stabilizer bar 171 when the collar 97 of the guide bar 96 carried by the cross head 102 (FIGURES 2 and 12) contacts and moves the switch arm 120 of the switch 118 to a closed position toward the end of the horizontal travel of the aligning fingers 150. This establishes a circuit (FIGURE 12) over the conductor 258, the now closed on-off switch 251, the conductor 257, a conductor 286, the now closed normally open switch 118, a conductor 287, a normally closed contact 288 of the switch 273, a conductor 290, a solenoid 291 of the air valve 138, a conductor 292 and the conductor 253. The solenoid 291 of the valve 138 operates this valve to introduce air from the tank T (FIGURE 1) through the conduit 141 into the vertical cylinder 133 and vents air from this cylinder through the conduit 140. This urges the piston head (not shown) in the cylinder 133 rapidly upwardly, as viewed in FIGURE 12 and in phantom outline in FIGURE 4, to move each of the aligning fingers 150 from the aligned row R of glassware particles on the take-away conveyor C.

Toward the end of the upward movement of the aligning fingers 150 as these fingers are being withdrawn from the row of aligned glassware R on the take-away conveyor C the vertical guide bar 127 associated with the switch 143 (FIGURES 2 and 3) contacts and moves the switch arm 144 thereof. This establishes a circuit (FIGURE 12) traced from the conductor 253, a conductor 293, a solenoid 294 of the valve 114, a conductor 295, a normally closed contact 296 of the switch 226, a conductor 297, the now closed switch 143, a conductor 298, a now closed normally open contact 300 of the switch 121 (noting that the cross head 102 is at this time out of contact with the switch arm 122), a conductor 301, the conductor 257, the closed on-off switch 251 and the conductor 258. The activation of the solenoid 294 over the circuit just traced actuates the solenoid air valve 114 to communicate air delivered from the tank T through the conduit 116 into the cylinder 104 and also vents air from the cylinder 104 through the conduit 115. This causes the piston rod 110, the cross head 102, the aligning fingers 150 and the stabilizer bar 171 to retract to the original position thereof at the beginning of the cycle shown in FIGURES 1 through 4 and 12 of the drawings. At the end of this movement, the cross head 102 strikes the switch arm 122 of the switch 121 which closes the normally open contact 121 to permit another operating cycle to commence in the manner already described.

A manual push button switch 302 is also included in the circuit 252 of the control system 250 of FIGURE 12 for initiating a test cycle of the unloader 20 in lieu of the "breaking" of the beam B by a leading one of the plurality of misaligned articles of glassware G. When the switch 302 is closed a circuit is traced from the conductor 258, the closed on-off switch 251, the conductor 257, the now closed switch 302, the conductor 268, the normally open, but held closed, contact 270 of the switch 121, the conductor 271, the solenoid 272 of the switch 273, the conductor 274 and the conductor 253. This circuit closes the normally open contact 275 of the switch 273 to energize the solenoid 278 of the valve 138 over an obvious circuit heretofore traced to introduce air into the vertical cylinder 133 and initiate a test cycle of the unloader 20.

During the description of the operational cycle of the unloader 20, the stabilizer bar 171 lightly contacts the upper edge portions E of the glassware articles G during the movement thereof by the aligning fingers 150 toward the take-away conveyor C, as is clearly illustrated in FIGURE 8 of the drawings. However, at times it is necessary or desirable to clamp the glassware between the aligning fingers 150 and a stabilizer bar corresponding to the stabilizer bar 171 of FIGURE 8. To this end, the stabilizer bar 171 of FIGURE 8 is provided with a plurality of stabilizer fingers 305 of FIGURE 9. Each of the stabilizer fingers 305 comprises a generally elongated rod 306 which is secured at an upper end portion thereof (not shown) to the stabilizer bar 171 in a conventional manner. One such conventional manner is to provide the upper end portion (not shown) and similarly provide a plurality of horizontal openings in the stabilizer bar 171. A nut and bolt (also not shown) can then be used to secure each of the stabilizer fingers 305 at a selected position on the stabilizer bar 171 in an obvious manner. The openings so formed in the stabilizer bar 171 are preferably equal in number and aligned with the openings or bores 148 in the finger mounting bar 130 to permit each of the stabilizer fingers 305 to be secured to the stabilizer bar 171 directly opposite an associated one of the plurality of aligning fingers 150 irrespective of the preselected positioning of these aligning fingers.

A lower end portion 307 of each of the stabilizer fingers 305 is offset at an angle of substantially 90 degrees to the rod 306. Each of these offset portions 307 terminate in an abutting head 308 which is preferably contoured to the general external peripheral contour of the glassware article (G of FIGURE 9) which is associated therewith.

The operation of the stabilizer fingers 305 is substantially identical to the operation of the stabilizer bar 171 except for the fact that the glassware article (G of FIGURE 9) is tightly gripped or grasped between the head 308 of the stabilizer finger 305 and a lowermost end portion of the aligning finger 150. It should also be particularly noted that the head 308 of the stabilizer finger 305 contacts an external surface portion of the glassware G of FIGURE 9 at a point below the center of gravity CG thereof, and at a point substantially below the upper edge portion of this glassware article. However, this point of contact can be varied merely by adjusting the adjusting mechanism 70 to move both the aligning fingers 150 and the stabilizer fingers 305 either upwardly or downwardly as may be found necessary or desirable. This point of contact may also be adjusted by setting the lock collar 165 (FIGURE 6) of each of the aligning fingers 150 at a preselected position, and when each of the stabilizer fingers 305 has a plurality of axially spaced openings corresponding to the first mentioned horizontal opening, securing each of the stabilizer fingers 305 to the stabilizer bar 171 in any one of these horizontal openings which positions the head 308 opposite the lower end portion of an associated one of the aligning fingers 150.

Referring to FIGURE 10 of the drawings, one of a plurality of aligning fingers 310 is illustrated in cooperative clamping relationship with the stabilizer bar 171. The aligning finger 310 is similar to the aligning finger 150 of FIGURE 9 but includes a relatively elongated tapered lower end portion 311 which has a surface contoured to the general internal tapered configuration of the glassware article G. In this embodiment of this invention, the stabilizer bar 171 is urged toward the plurality of aligning fingers 310 under the influence of a spring, such as the spring 181 of FIGURE 5, to tightly clamp an upper end portion E of the article G between the stabilizer bar 171 and the plurality of aligning fingers 310. Thereafter, both the stabilizer bar 171 and the aligning fingers 310 are simultaneously lifted upwardly a slight distance to space the article G slightly above a surface S, which may, for example, be the upper run 167 of the lehr conveyor 30. This upward movement may be accomplished by any of a plurality of conventional mechanisms. For example, a cam roller or follower can be secured to each end of the finger mounting bar 131 of the unloader 20 in cooperation with camming mechanisms (such as the camming mechanism 210) beginning at a point along the path of the lehr conveyor 30 where the glassware is clamped and terminating at a point adjacent the take-away conveyor C where the glassware is released. Such a camming mechanism would urge the finger mounting bar 131 slightly upwardly against the force of the compressible air in the vertical cylinder 133 to maintain the aligning fingers 310 and the stabilizing bar 171 in the solid line position illustrated in FIGURE 10 between the point at which the glassware is aligned and the point at which the glassware is repositioned in an aligned row on the take-away conveyor C.

Attention is now directed to FIGURE 11 of the drawings which illustrates one of a plurality of the aligning fingers 312 supported by a finger mounting bracket 313 which is in turn carried by a finger mounting bar 314. The finger mounting bar 314 is substantially identical to the finger mounting bar 131 of FIGURE 6, and the bracket 313 is substantially identical to the bracket 151 of the same figure. However, in lieu of the substantially vertical bore or opening 163 in the bracket 151 of FIGURE 6, the bracket 313 is provided with a vertical bore or opening 315 which is angularly related with respect to an axis of a glassware article A. The aligning finger 312 is slidably received in a bore 316 of a sleeve 317 which is in turn received in the bore 315 of the bracket 313 and secured therein by a generally radial set screw 318. A substantially annular locking collar 320 is secured by a radial set screw 321 to a portion of the aligning finger 312 above the sleeve 317. The collar 320 functions in a manner identical heretofore described in the consideration of the collar 165 of FIGURE 6, and a further description thereof is deemed unnecessary for a complete understanding of this invention.

The offset angular relationship of the aligning finger 312 with respect to the axis of the article A, permits the aligning finger 312 to cooperate with a stabilizer bar 322 when the article A has a reduced neck N and/or an outwardly radially directed securing lug L, or other conventional means for securing a closure on the neck N of the article A. This inclined or slanted disposition of the aligning finger 312 is particularly effective in aligning and transferring glassware of a relatively wide-mouth construction and which presents internal obstructions, such as the internal wall of the neck N, tending to prevent a vertical finger from contacting an inner portion of the article A below the center of gravity thereof.

Each of the aligning fingers and stabilizer bars heretofore described and illustrated in FIGURES 8 through 11 of the drawings cooperate to either lightly contact (FIGURES 8 and 11), tightly clamp (FIGURE 9) or both clamp and lift (FIGURE 10) the glassware with which these elements are associated. However, in addition to these effects each of the aligning fingers and stabilizer bars of FIGURES 8 through 11 can tilt or tip the glassware without lifting the same completely above a supporting surface upon which the glassware is being conveyed. For example, by withdrawing the bolts 187 and 197 of the pivotable connectors 172 and 173, respectively, the stabilizer bar 171 of FIGURE 8 will be pivoted by the force of the spring 181 (FIGURE 5) to forceably contact the upper edge portion E of the article G of FIGURE 8 and tilt or tip the same in a counterclockwise direction (as viewed in this FIGURE 8) with the lower end portion of the aligning finger 150 acting as a fulcrum. This raises an upstream-most or bottom portion of the article G upwardly, while the trailing bottom portion remains in contact with the supporting surface of, for example, the upper run 167 of the lehr conveyor 30. This tilting or tipping facilitates the transfer of the glassware across the gap or interruption between the lehr conveyor 30 and the take-away conveyor C by preventing contact between the leading bottom edge of the glassware and the longitudinal edge of the take-away conveyor C adjacent the lehr conveyor 30, as is best illustrated in FIGURE 2 of the drawings.

The elimination of the conventional camming mechanism described during the consideration of FIGURE 10 would inherently produce the aforementioned tilting or tipping in an obvious manner, while the repositioning of the head 308 of the stabilizing finger 305 of FIGURE 9 above the lowermost end portion of the finger 150 associated therewith would result in a similar tipping or tilting of the article G shown in this latter figure.

Other various modifications of the unloader 20 of this invention will be readily apparent to those skilled in the art after reviewing this disclosure, and such modifications are deemed within the scope of this invention. For example, to prevent marring or other damage to the finish of the glassware G as it is being transferred by the unloader 20 between the plurality of aligning fingers and the stabilizer bar, the stabilizer bar can be provided with a resilient, non-abrasive pad or strip of material, such as rubber or nylon, facing the plurality of aligning fingers. The aligning finger, though preferably constructed from wood, may also be made of metal, plastic or similar material. When constructed of metal, these fingers are preferably coated with a generally non-abrasive, resilient material, such as rubber, nylon or similar plastic material.

The retracting movement of either or both of the piston rods 110 and 135 of the respective cylinders 104 and 133 can be adjusted by various mechanisms, only one of which is illustrated and has not heretofore been described. Such an adjusting mechanism is best illustrated in FIGURES 3 and 4 of the drawings and is generally designated by the reference numeral 325. The mechanism 325 is an externally threaded tube 326 which is coaxially received in the vertical cylinder 133. An internally threaded collar 327 is threadably received on the tube 326 and is secured in a conventional manner to an uppermost end portion of the vertical cylinder 133. A lowermost end portion of the tube 326 projects axially downwardly into the interior of the cylinder 133, as viewed in FIGURES 3 and 4 of the drawings, while the exposed upper end portion of the tube 326 is connected by a conventional rotating union 328 to the flexible conduit 140. By rotating the tube 326 with respect to the collar 327, the tube 326 can be axially adjusted with respect to the cylinder 133 to vary the point at which a lowermost end portion of the tube 326 is positioned in the vertical cylinder 133. When the piston rod 135 is retracted, the piston head (not shown) connected thereto will contact and be stopped by the lowermost end portion of the tube 326 at any preselected point in the cylinder 133 in an obvious manner.

While a preferred structure and arrangement of parts embodying the unloader of this invention are disclosed herein, it is to be understood that variations in the structure and arrangements may be made without departing from the spirit and scope of this invention as defined in the appended claims.

We claim:
1. Unloader apparatus comprising first means adapted to be positioned adjacent a plurality of articles each having at least a single open end defined by a body wall portion of a predetermined diameter, said first means being movable in a first direction for entering articles, some of which may be misaligned, second means for moving said first means in a direction other than said first direction for automatically aligning the misaligned articles so entered by said first means, said first means being moved by said second means against the body wall portions causing alignment of misaligned articles, and said first means being moved in said other direction a distance at least equal to said predetermined diameter.

2. The unloader apparatus as defined in claim 1 including means for stabilizing the articles entered by said first means during at least a portion of the movement thereof in said other direction.

3. The unloader apparatus as defined in claim 2 including means for selectively adjusting said members relative to each other to selectively vary the spacing therebetween dependent upon the predetermined diameter of the articles which are to be aligned.

4. The unloader apparatus as defined in claim 1 wherein said first means comprise a plurality of aligned elongated members spaced from each other in a direction generally transverse to said other direction.

5. Unloader apparatus comprising a plurality of means for entering open ends of a plurality of articles from a first direction, means for moving the plurality of means in a second direction substantially normal to the first direction and for a distance at least substantially equal to the diameter of the articles to align the articles so entered by said plurality of means, and means for stabilizing the articles entered by said first means during at least a portion of the movement thereof in the second direction.

6. Unloader apparatus comprising support means adapted to be positioned above a conveyor transporting a plurality of articles having upwardly opening ends, a plurality of means for entering articles, some of which may be misaligned, through the open ends thereof from a first direction, means for moving said plurality of means in the first direction, means for moving the plurality of means in a second direction substantially normal to said first direction whereby the articles are each internally contacted by said plurality of means and aligned thereby and means for stabilizing the articles during at least a portion of the movement thereof in the second direction.

7. Unloader apparatus comprising support means adapted to be positioned above a conveyor transporting a plurality of articles having upwardly opening ends, a plurality of means for entering articles, some of which may be misaligned, through the open ends thereof from a first direction, means for moving said plurality of means in the first direction, means for moving the plurality of means in a second direction, means for lifting the articles during at least a portion of the movement thereof in the second direction whereby the articles are each internally contacted by said plurality of means and aligned thereby and means for stabilizing the articles during at least a portion of the movement thereof in the second direction.

8. Unloader apparatus comprising support means adapted to be positioned above a conveyor transporting a plurality of articles having upwardly opening ends, a plurality of means for entering articles, some of which may be misaligned, through the open ends thereof from a first direction, means for moving said plurality of means in the first direction, means for tilting the articles during at least a portion of the movement thereof in the second direction whereby the articles are each internally contacted by said plurality of means and aligned thereby and means for stabilizing the articles during at least a portion of the movement thereof in the second direction.

9. Unloader apparatus particularly adapted to be positioned above a lehr conveyor transporting misaligned open-end glassware each having at least a single open end defined by a body wall portion of a predetermined diameter from a lehr to a take-away conveyor, said apparatus comprising a plurality of elongated members carried by a first support, first means for reciprocating said members in a first direction for entering said glassware, second means for reciprocating said first means in a second direction substantially normal to said first direction, said members being moved by said second means against said body wall portions causing alignment of misaligned articles, means controlling the reciprocation of said first and second means, and said controlling means being effective for moving said members in said second direction a distance at least equal to said predetermined diameters.

10. Unloader apparatus particularly adapted to be positioned above a lehr conveyor transporting misaligned open-end glassware from a lehr to a take-away conveyor, said apparatus comprising a plurality of aligned elongated members carried by a first support, first means for reciprocating said members in a first direction, second means for reciprocating said first means in a second direction substantially normal to said first direction, stabilizing means substantially normal to said first direction, stabilizing means adjacent each of the plurality of members and means for moving said stabilizing means toward the plurality of members during reciprocation in one of the first and second directions, and away from the plurality of members during reciprocation in the other of the first and second directions.

11. The apparatus as defined in claim 10 wherein means are provided for adjusting said members relative to said first support.

12. The apparatus as defined in claim 10 wherein said stabilizing means are mounted for pivoting movement and said last mentioned means includes cam means for imparting pivoting movement to said stabilizing means.

13. The apparatus as defined in claim 10 wherein means are provided for adjusting said members relative to said first support, said stabilizing means are mounted for pivoting movement and said last mentioned means includes cam means for imparting pivoting movement to said stabilizing means.

14. A transfer mechanism comprising a first member, a plurality of elongated members carried by said first member, means for moving said first member in first and second directions substantially normal to each other, a second member, means movably mounting said second member with respect to said first member and in cooperative relationship with at least some of the plurality of elongated members, and said last mentioned means including cam means for moving said second member in one direction as the first member is moved in the first direction and in another direction as the first member is moved in the second direction.

15. The transfer mechanism as defined in claim 14 wherein said elongated members are carried in alignment by said first member and are substantially normal to said second member.

16. The transfer mechanism as defined in claim 14 wherein means are provided for adjusting the position of each of said elongated members.

17. The transfer mechanism as defined in claim 14 wherein said elongated members are each slidably carried by said first support for relatively unrestricted movement in said first direction.

18. In an assembly of the type including a plurality of elongated members carried by a support for entry into a plurality of articles through open ends thereof, the improvement comprising means slidably mounting said plurality of elongated members with respect to said support, said means including a plurality of sleeves each of which has a bore and one of the elongated members being slidably received in and projecting outwardly from each of said bores.

19. In an assembly of the type defined in claim 18 including means cooperative between each of said elongated members and the sleeves for adjusting the outward projection of said members with respect to said bores.

20. In an assembly of the type defined in claim 19 wherein said cooperative means is a collar adjustably carried by each of the elongated members.

21. An unloader apparatus comprising a base, a first support carried by said base, first reciprocal means for moving said first support with respect to said base in a first direction, a second support, second reciprocal means between said first and second supports for moving said supports relative to each other in a second direction substantially normal to said first direction, a plurality of elongated members, means mounting said elongated member for relative sliding movement with respect to said second support in a direction substantially parallel to said second direction, a third support, means pivotally journalling said third support to said second support in substantially parallel relationship thereto and in spaced relationship to said elongated members, and cam means between said base and said last mentioned means for pivoting said third support toward and away from the elongated members during the movement of said first and second supports.

22. An unloader apparatus comprising a plurality of aligned elongated members adapted to be positioned above and transverse to a predetermined path of travel along which are adapted to be moved a plurality of misaligned articles having upwardly opening ends, first means for moving said member in a first direction normal to said predetermined path for insertion into open ends of the articles, second means for moving said members parallel to said predetermined path whereby the misaligned articles are ligned, means for cyclically controlling the movement of said member, said last mentioned means including electrical circuit means, means included in said circuit means for detecting articles being transported along said predetermined path, relay means connected to said detecting means, and solenoid means connected between said relay means and said first and second means for selectively moving said members relative to said predetermined path.

23. A method of aligning a plurality of misaligned articles comprising the steps of positioning a plurality of members adjacent a plurality of articles each having at least a single open end defined by a body wall portion of a predetermined diameter, moving the members in a first direction to enter articles some of which may be misaligned, moving the members in a direction other than the first direction for automatically aligning the misaligned articles so entered by the members, the members being moved against the body wall portions causing alignment of the misaligned articles, and the members being moved in the other direction a distance at least equal to the predetermined distance of the body wall portions.

24. The method of aligning a plurality of misaligned articles as defined in claim 23 wherein the movement of said members in the other direction is substantially normal to the movement thereof in said first direction.

25. The method of aligning a plurality of misaligned articles as defined in claim 23 including the step of stabilizing each article during the movement thereof in said other direction.

26. The method of aligning a plurality of misaligned articles as defined in claim 23 including the step of lifting each article during the movement thereof in said other direction.

27. The method of aligning a plurality of misaligned articles as defined in claim 23 including the step of tilting each article during the movement thereof in said other direction.

References Cited by the Examiner
UNITED STATES PATENTS

| | | | |
|---|---|---|---|
| 2,119,725 | 6/1938 | Stecher | 214—309 |
| 2,176,624 | 10/1939 | Ferry | 214—309 |
| 2,953,407 | 9/1960 | Cella | 214—309 |
| 3,096,871 | 7/1963 | Anderson | 198—34 |

EVON C. BLUNK, *Primary Examiner.*

RICHARD E. AEGERTER, *Examiner.*